US005448225A

United States Patent [19]

Maignon et al.

[11] Patent Number: 5,448,225

[45] Date of Patent: Sep. 5, 1995

[54] BROADCAST CONTROL CENTER FOR AUDIOVISUAL PROGRAMS

[75] Inventors: Françoise Maignon, Montrouge; Bernard Lemaire, Fresnes; Jean-Luc Lipski, Vineuil; Sidney Carcin, Ivry Sur Seine, all of France

[73] Assignee: Telediffusion De France, Paris, France

[21] Appl. No.: 18,406

[22] Filed: Feb. 17, 1993

[30] Foreign Application Priority Data

Feb. 18, 1992 [FR] France ................................ 92 01814

[51] Int. Cl.[6] ......................... H04Q 5/02; G11B 17/04

[52] U.S. Cl. ................................ 340/825.25; 369/178; 414/786

[58] Field of Search ........... 318/568.2, 568.21, 568.23, 318/568.25, 51; 414/786; 340/825.25, 825.34; 381/77; 369/34, 30, 176, 178, 191, 192, 195

[56] References Cited

U.S. PATENT DOCUMENTS

| | | | |
|---|---|---|---|
| 3,761,888 | 9/1973 | Flynn . | |
| 4,163,183 | 7/1979 | Engelberger et al. | 318/568.2 |
| 5,136,222 | 8/1992 | Yamamoto et al. | 318/568.2 |
| 5,172,413 | 12/1992 | Bradley et al. | 340/825.24 |
| 5,206,943 | 4/1993 | Callison et al. | 369/178 |
| 5,217,345 | 6/1993 | Baur | 414/786 |
| 5,313,524 | 5/1994 | Van Hulle | 340/825.25 |
| 5,341,350 | 8/1994 | Frank et al. | 369/30 |

FOREIGN PATENT DOCUMENTS

| | | | |
|---|---|---|---|
| 0394939 | 10/1990 | European Pat. Off. . |
| 2238030 | 2/1974 | Germany . |

OTHER PUBLICATIONS

Mosaic—Ein Modernes Fernbediensystem Fur Fernsehstudioanlagen, Von Karl-Heinz Trissl, 579 Rundfunktechnische Mitteilungen, vol. 26 (1982) Jan.–Feb., No. 1, Norderstedt, Deutschland.

ICS—Ein Innovatives Steuersystem für Fernsehschalträume, H. Claus, 8195 FKT Fernsehund Kino-Technik Studiotect 43 (1989) Dec., No. 12, Heidelberg, Deutschland.

*Primary Examiner*—Donald J. Yusko
*Assistant Examiner*—David Yiuk Jung
*Attorney, Agent, or Firm*—Barnes & Thornburg

[57] ABSTRACT

An audiovisual program broadcast control center including at least one robot for controlling at least one device containing program information; a central control console for manually controlling the robot; a central programmable automatic controller for controlling the robot; and a data transmission bus for connecting the control console and the automatic controller to the robot.

13 Claims, 1 Drawing Sheet

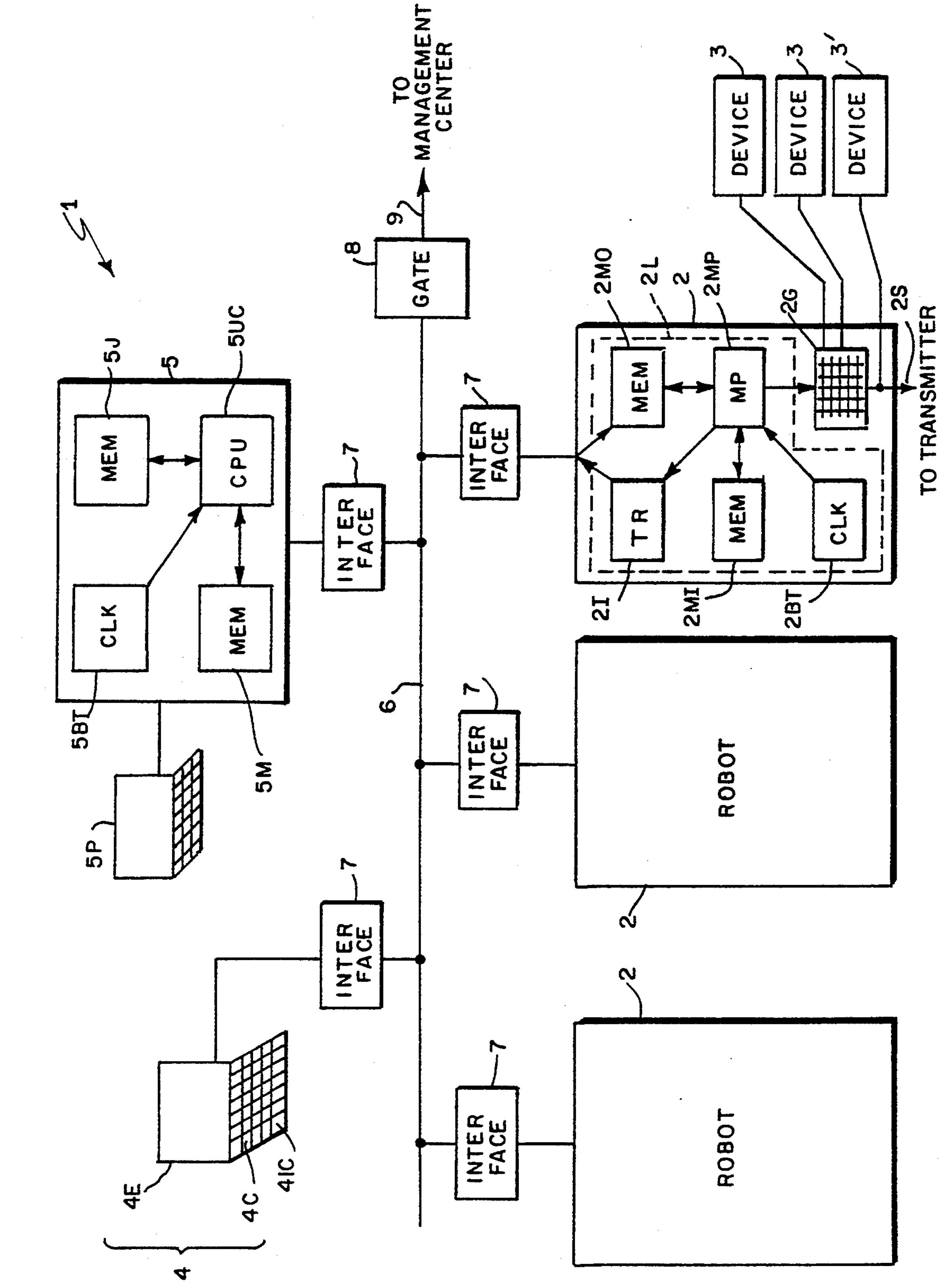
1
TO MANAGEMENT CENTER
9
8
GATE
5
5J
5UC
MEM
CPU
CLK
MEM
5BT
5M
5P
7
INTER FACE
6
2MO
2L
2
2MP
2G
2S
TO TRANSMITTER
MEM
MP
TR
MEM
CLK
2I
2MI
2BT
3
3
3'
DEVICE
DEVICE
DEVICE
ROBOT
ROBOT
2
4E
4C
4IC
4

BROADCAST CONTROL CENTER FOR AUDIOVISUAL PROGRAMS

BACKGROUND AND SUMMARY OF THE INVENTION

The present invention relates to a broadcast control center and more specifically for use in managing the sequencing of audiovisual broadcasts, particularly radio and television broadcasts, originating from a plurality of devices.

Such control centers include robots which select prerecorded cassettes, grasp them by a cassette manipulator and load them in a playback unit. These robots are programmed such that their operation is completely self-controlled. Moreover, control consoles are installed on each type of video or audio device, making it possible to control a selector grid or matrix for selecting the device output connected to one of the inputs of this grid and switching it to the output or to one output of this grid which is connected to the transmitter, and to the transmitting antenna in the case of radio broadcasting. Such consoles also comprise a variety of adjustment switches, to regulate the amplitude and audio frequency of the broadcast for example.

This type of configuration is inflexible. Indeed, the programming of the robots is fixed such that, if the normal broadcasting sequence is interrupted by an unexpected event, the sequencing must be overridden manually and a new sequence must be redefined for the robots.

Moreover, because the consoles for controlling the selector grids are installed near the pertinent devices, this requires a special trip by the technician in charge of managing the sequence. In practice, this requires these consoles be situated in relatively close proximity to one another, so that selections and adjustments can be made in time at the beginning of each broadcast.

In Rundfunktechnische Mitteilungen, Vol. 26, No. 1, January 1982, Nordestedt, Germany, there is described a broadcast control center comprising an automatic controller which controls the sequencing of robot operations through a bus. A control console is connected separately to the automatic controller.

This type of configuration displays a disadvantage in that it does not provide a system for manually controlling the control center in the case of an unforeseeable event, such as a failure of the automatic controller, or a news bulletin requiring that the programs be changed momentarily.

Thus it is an object of the present invention to overcome this problem.

This and other objects are achieved by an audiovisual program broadcast control center including at least one robot for controlling at least one device containing program information; a central control console for manually controlling the robot; a central programmable automatic controller for controlling the robot means; and a data transmission bus for connecting the control console and the automatic controller to the robot.

In this matter, from a single, central control console, it is possible to send commands to one or more robots, in a nearby or remote location, to coordinate the broadcasting sequence of several devices, both video and audio, and to adjust their transmission characteristics, without wasting time. Should it become unexpectedly necessary to redefine a broadcasting sequence quickly, the console replaces the automatic controller and takes over while the automatic controller is temporarily disabled and while it is being reprogrammed to centrally transmit to each robot micro-instructions detailing each basic step, such as turning on a magnetic tape reader, then reading the tape at the end of a specified period of time.

The data transmission bus is used to transmit data from the control console or the automatic controller to the robots, thereby limiting the amount of wiring required. It also enables the control console to store updated information on the data transferred between the automatic controller and the robots, allowing it to override the system if necessary and to manually control the robots in response to this information. In particular, this bus may be extremely long, providing for the synchronized operation of robots located in different areas. Similarly, the control console may be installed in a technical room located at some distance from an operator control panel for the automatic controller.

A slave logic for the robot may advantageously be provided to receive commands from the automatic controller or the control console and to actuate the robot in response to these commands. This logic may, for example, contain macro-instructions defining a sequence of the said basic micro-instructions, such that only those commands corresponding to the macro-instructions are transmitted, thereby reducing traffic on the bus.

In addition, the slave logic may include storage for recording a command sequence generated by the automatic controller. In this case, the automatic controller, which has transmitted these commands previously, needs only to validate them for execution at the appropriate time by sending a brief command.

To relieve the automatic controller from the task of sending such commands to validate execution of commands stored by the robots, a clock may be provided for the robot and configured to supply timing information to the said slave logic, for sequencing the execution of the said commands.

Because the slave logic manages the sequencing itself, the bus employed does not need to be a high-speed transmission bus or real-time bus.

The operation of the robots may be monitored by information transmitted data transmission transponder from the slave logic to the automatic controller or the control console, enabling the control console to display errors or to display the configuration of the devices managed by the robot.

To facilitate management of program broadcasts, the automatic controller may be equipped with memory to store a log listing completed broadcast sequences, which may be used to compile error statistics and for accounting purposes, for example to calculated royalties or identify faulty commercial announcements.

This bus may be connected to an expansion unit, or to a data or control server through a gateway connecting the control center to a remote location by a data transmission network.

Advantageously, to provide an operator/machine interface, an operator control panel is connected to the programmable automatic controller. This control panel may be situated in a remote location, away from the automatic controller. Conversely, this operator control panel may be integrated in the automatic controller to produce a more compact assembly.

Other objects, advantages and novel features of the present invention will become apparent from the following detailed description of the invention when considered in conjunction with the accompanying drawings.

BRIEF DESCRIPTION OF THE DRAWINGS

The FIGURE is a schematic of a program broadcast control system incorporating the principles of the present invention.

DETAILED DESCRIPTION OF THE DRAWINGS

The television program broadcast control center 1 represented in the FIGURE includes a plurality of robots 2, three are illustrated in this instance, for selecting one of several devices 3 containing information or programs stored in memory or generated in real time, and connecting the selected devices 3 to a transmitter by an output 2S. The devices 3 may be a cassette playback unit or a video camera, for example. The selection is effected by a slave logic 2L of the associated robot 2. In a first case, a manipulating device (not shown) for audio or video cassettes loads the selected cassette into a player 3′ whose output is connected directly to the output 2S of the robot. In a second case, a selector grid 2G of the robot 2 receives audio and/or video channels from devices 3, for example cameras, switches one of these channels to the output 2S.

A central control console 4 comprises control devices 4C, such as keyboard, switches and potentiometers, for issuing commands to the various devices 3 associated with the robots 2 and which are transmitted to the devices by the robots and a data transmission bus 6. There is also provided a monitor 4E, which receives information on the status of the devices 3 and enables the operator to interact with the machine to adjust broadcasting sequences in real time from the control console 4.

In addition, a programmable automatic controller 5 is connected by the data transmission bus 6 to the control console 4 and to the robots 2. A central processing unit 5UC of the automatic controller 5, including a microprocessor, is associated with a program memory 5M and a clock 5BT. The central processing unit 5UC manages broadcast sequencing in response to commands previously entered by an operator control panel 5P for the automatic controller 5 or through a gateway 8, described hereinbelow, by sending commands to the slave logics 2L. A memory 5J is provided to store a log listing the broadcasts that have taken place.

The control console 4 includes components (not shown) that are identical to those (5UC, 5M, 5BT) described in the foregoing for the automatic controller 5 and includes a key 41C for activating the control console 4, enabling it to override the automatic controller 5 and to take control over the robots 2. The operator control panel 5P, which is connected to the automatic controller 5, provides an operator/machine interface for entering sequencing commands to be sent to the robots 2.

In this example, a microprocessor 2MP provides local processing capacity for the slave logics 2L and enables them to automatically execute command sequences received from the automatic controller 5.

A local clock 2BT of a robot 2 supplies timing information to its slave logic 2L and enables it to execute the stored commands at the specified time. In addition, the slave logic 2L includes a memory 2MP for storing micro-instruction sequences, wherein each sequence corresponds to a macro-instruction, that is, to a command such as those issued by the automatic controller 5 or the control console 4.

The slave logic 2L further includes a transponder 2I for transmitting data to the automatic controller 5, such data being transmitted spontaneously or in response to a command from the automatic controller, and representing status information for the devices 3, for example. The slave logic 2L also includes memory 2MO for storing commands received through the bus 6.

Bus interfaces 7, respectively associated with each component connected to the bus 6, include the hardware and software means needed to manage data transfers on the bus 6. These means are well-known by persons of ordinary skill in the art and shall therefore not be described in detail.

There is also provided a dedicated bus interface, in the form of a gateway 8 including a logic for converting between the X.25 packet transmission protocol (CCITT recommendation) and the protocol of bus 6. This gateway 8 is connected to an X.25 data transmission network 9.

This broadcast control center 1 operates in the following manner. In a preliminary stage, an operator programs the desired program broadcasting sequence via the operator control panel 5P for the automatic controller 5. Once the sequence has been entered properly, the operator sends it to the pertinent slave logic 2L, using their known addresses, through bus 6, via the automatic controller 5.

Each of these slave logics 2L stores the commands received in memory 2MO and executes them at the time indicated by the clock 2BT of the robot 2. To execute a command, it addresses the micro-instruction memory 2MI through a command decoder (not shown), which supplies the micro-instruction sequence required to execute this command. This avoids using the automatic controller 5 to transmit this sequence, thereby reducing traffic on the bus 6.

The transponder 2I for transmitting data to the bus 6 supplies information to the automatic controller 5 and the control console 4 on the status of the robot 2 and its associated devices 3. This enables an operator with access to the control console 4 to react quickly in the event of failure of a device 3, of a robot 2 or even of the automatic controller 5, and to reprogram the sequencing of the various robots 2, as the operator receives information via the monitor 4E. The operator may override the system manually at any time, and take control over the control center 1 by depressing the activation key 41C of the control console 4.

Because the control console 4 is equipped with suitable means for controlling the robots 2 and because it has access to information on the status of all robots 2 and devices 3, provided by data transmitted on the bus 6 by the data transponder 2I, it can effectively take control over the control center 1 to operate it manually.

The gateway 8, which is connected to the data transmission network 9, in the packet mode in this example, makes it possible to transfer data bidirectionally between the automatic controller 5 and a management center, for example to send information pertaining to the sequencing of scheduled broadcasts to the automatic controller 5. In the other direction, the automatic controller 5 transmits to the management center the log stored in the memory 5J and providing a report of broadcasts that have already taken place, for statistical and billing purposes. If this gateway 8 is expected to generate too much traffic on the bus 6, it may be installed directly into the automatic controller 5 or its bus interface 7.

Although the present invention has been described and illustrated in detail, it is to be clearly understood that the same is by way of illustration and example only, and is not to be taken by way of limitation.

While only television programs were mentioned in the description hereinabove, the invention applies to other types of audio, video or audiovisual programs, such as radio or cable television programs, or any prerecorded media. The spirit and scope of the present invention are to be limited only by the terms of the appended claims.

What is claimed:

1. An audiovisual program broadcast control center comprising:
   - at least one robot means for controlling at least one device containing program information;
   - a central control console means for manually controlling said robot means;
   - a central programmable automatic controller means for controlling said robot means; and
   - a data transmission bus means for connecting said control console means and said automatic controller means individually to said robot means.

2. A control center as claimed in claim 1, wherein said robot means includes slave logic means for receiving commands generated by the automatic controller means and actuating said robot means in response to said received commands.

3. A control center as claimed in claim 2, wherein the said slave logic means includes first storage means for storing a command sequence generated by said automatic controller means.

4. A control center as claimed in claim 3, wherein said robot means includes a clock means for supplying timing information to said slave logic for use in sequencing the execution of said stored commands.

5. A control center as claimed in claim 2, wherein said slave logic means includes means for transmitting data to said automatic controller means.

6. A control center as claimed in claim 1, wherein said automatic controller means includes memory means for storing a log.

7. A control center as claimed in claim 1, including a gateway means for connecting said control center to remote location by a data transmission network.

8. A control center as claimed in claim 1, wherein said automatic controller means includes an operator control panel for programming said automatic controller means.

9. A control center as claimed in claim 1, wherein said control console means includes means for manually overriding control of said robot means by said automatic controller means.

10. A control center as claimed in claim 1, wherein said robot means includes a plurality of devices and includes selection means for selecting one of said devices.

11. A control center as claimed in claim 1, including a gateway means for bidirectionally connecting said automatic controller means to a remote location via a data transmission network.

12. A control center as claimed in claim 1, wherein said slave logic means includes means for transmitting data to said control console and said automatic controller means; and said control console includes means for displaying said transmitted data.

13. A control center as claimed in claim 3, wherein the said slave logic means includes second storage means for storing a sequence of instruction for executing each of said commands.

* * * * *